(12) United States Patent
Miyoshi

(10) Patent No.: US 7,272,656 B2
(45) Date of Patent: Sep. 18, 2007

(54) ADDRESS MANAGEMENT SYSTEM, INTERFACE ID SETTING PROCESSOR, COMMUNICATION TERMINAL, ADDRESS MANAGEMENT METHOD, AND COMPUTER PROGRAM

(75) Inventor: Yutaka Miyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 10/214,001

(22) Filed: Aug. 7, 2002

(65) Prior Publication Data

US 2003/0074570 A1    Apr. 17, 2003

(30) Foreign Application Priority Data

Aug. 7, 2001  (JP)  ............................ P2001-239146

(51) Int. Cl.
G06F 15/17       (2006.01)
H04L 12/28       (2006.01)

(52) U.S. Cl. .................. 709/230; 709/245; 709/202; 709/223; 709/224; 709/228; 370/390; 370/355; 370/448; 370/389; 370/374; 713/186; 713/173; 713/175; 713/176; 713/200; 713/201

(58) Field of Classification Search ................ 709/225, 709/201, 226–230, 245; 370/390, 392, 400; 713/186, 173, 201
See application file for complete search history.

(56) References Cited

U.S. PATENT DOCUMENTS 6,064,879 A    5/2000  Fujiwara et al.
6,175,867 B1 *  1/2001  Taghadoss .................. 709/223
6,775,267 B1 *  8/2004  Kung et al. ................. 370/352
6,826,690 B1 * 11/2004  Hind et al. ................. 713/186
6,853,639 B1 *  2/2005  Watanuki et al. ........... 370/390
6,895,007 B1 *  5/2005  Teraoka ..................... 370/392
6,973,506 B2 * 12/2005  Ishiyama et al. ........... 709/245

FOREIGN PATENT DOCUMENTS

| JP | 11-308321 | 11/1999 |
| JP | 2000-011075 | 1/2000 |
| JP | 2000-102072 | 4/2000 |
| WO | 00/60824 | 10/2000 |

* cited by examiner

Primary Examiner—David Wiley
Assistant Examiner—Jude J. Jean-Gilles
(74) Attorney, Agent, or Firm—Bell, Boyd & Lloyd LLP

(57) ABSTRACT

In an address management system, an interface ID can be handed over from one apparatus to another without losing the correspondence between the interface ID and a user. As a result, the interface ID can be used as a unique identifier for the user. Accordingly, an effective infrastructure for individualized services is achieved. The interface ID may be constant for one user even when an apparatus is replaced, and thus IPv6 communication can be used as a user-associated address in high availability services, such as telephone services. Furthermore, the interface ID can be returned and reused, and thus the interface ID can be efficiently used.

26 Claims, 10 Drawing Sheets

FIG. 4
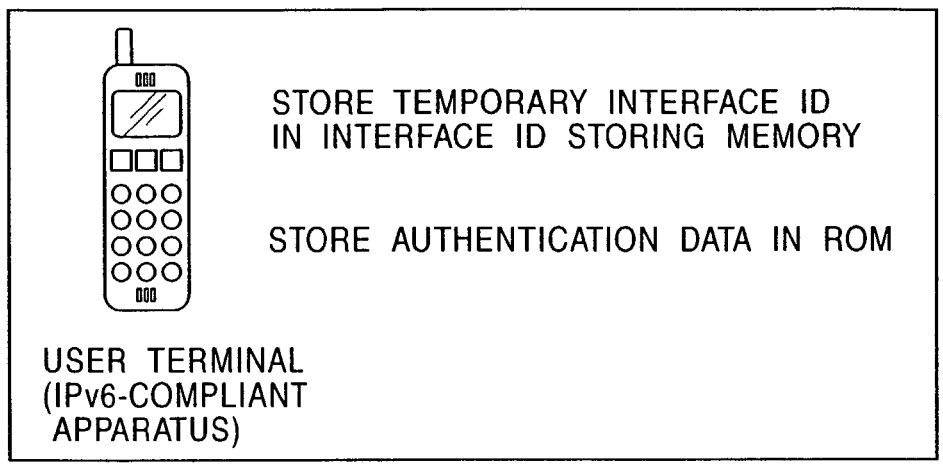
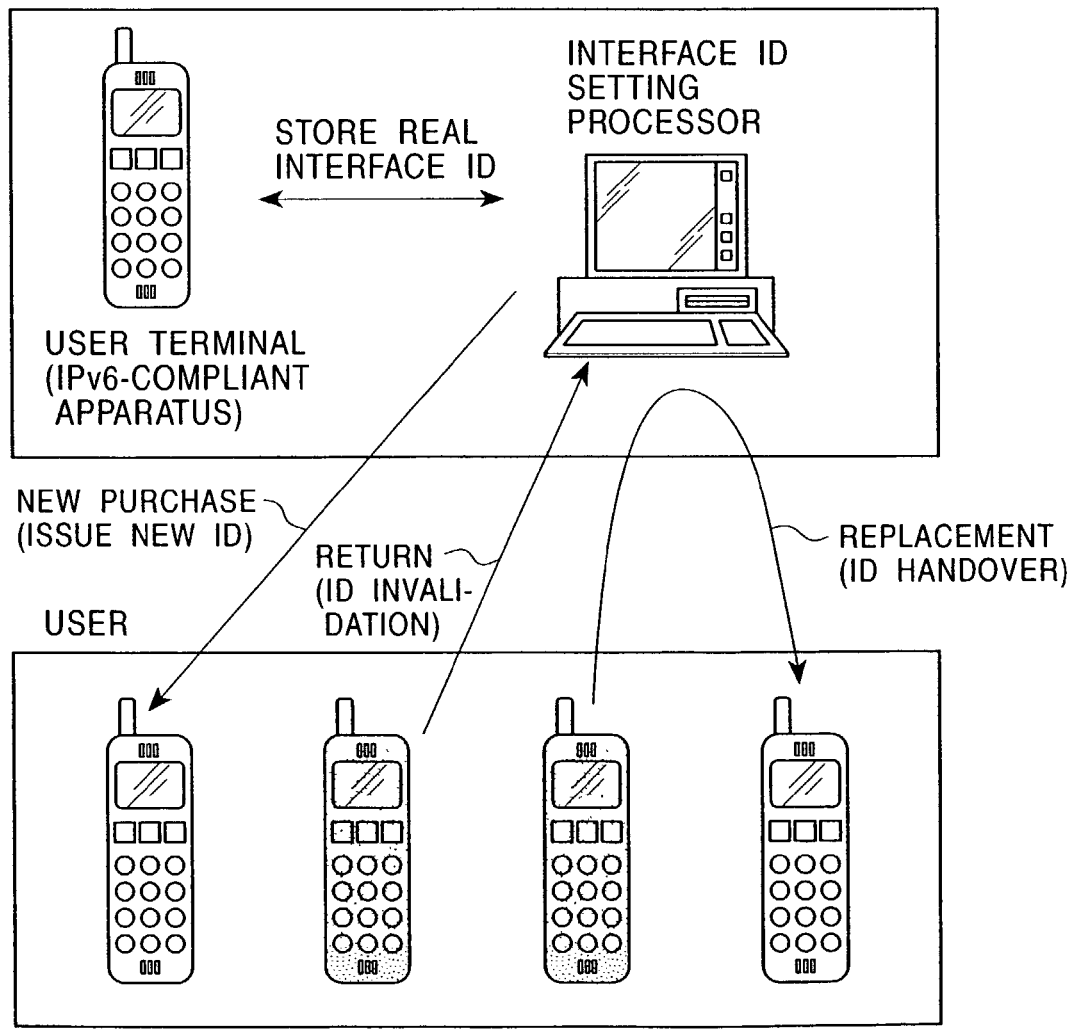

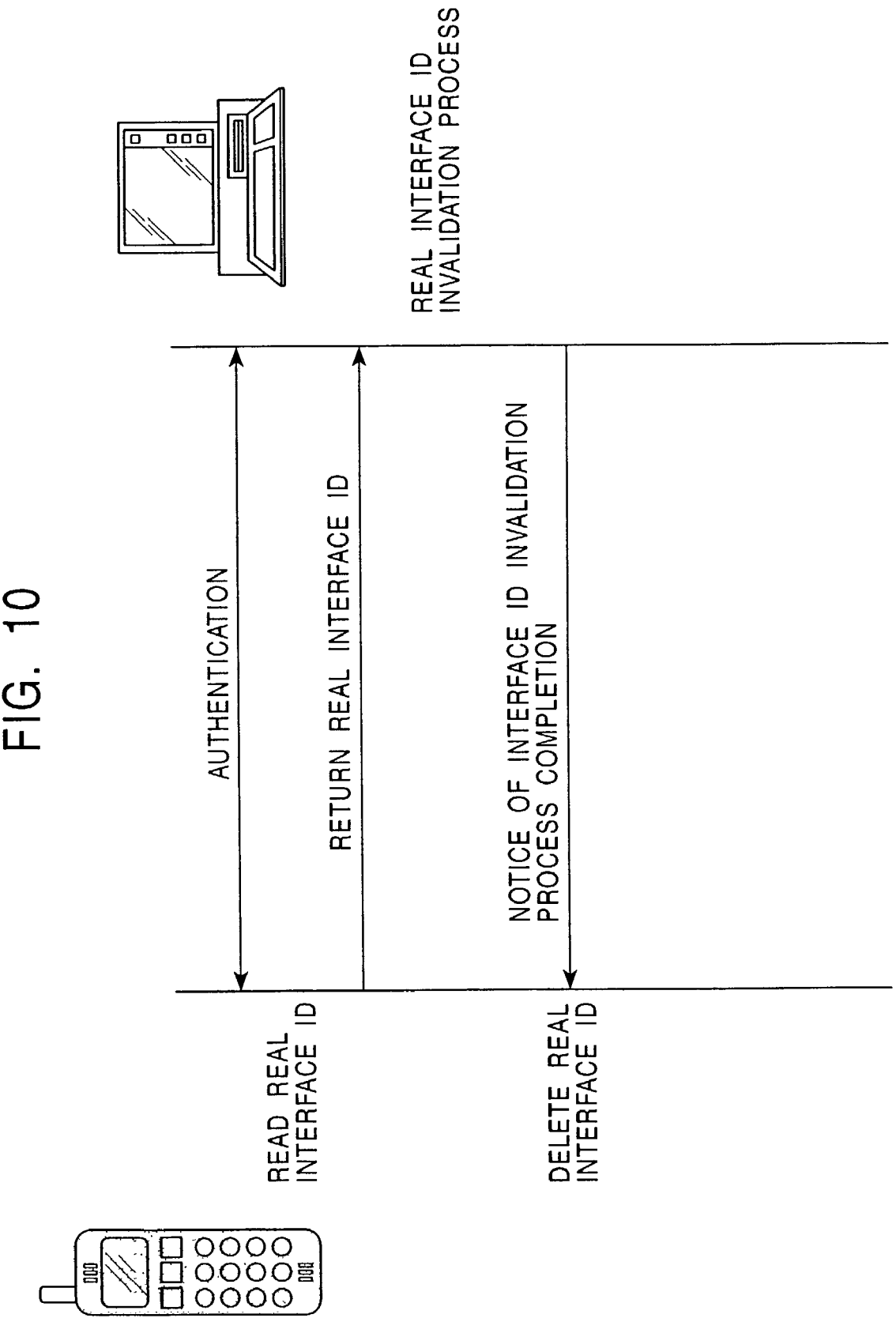

ADDRESS MANAGEMENT SYSTEM, INTERFACE ID SETTING PROCESSOR, COMMUNICATION TERMINAL, ADDRESS MANAGEMENT METHOD, AND COMPUTER PROGRAM

BACKGROUND OF THE INVENTION

The present invention relates to an address management system, an interface ID setting processor, a communication terminal, an address management method, and a computer program. More specifically, the present invention relates to an address management system, an interface ID setting processor, a communication terminal, an address management method, and a computer program, in which an interface ID in the Internet Protocol version 6 (IPv6) can be smoothly received and transmitted between apparatuses.

In recent years, mobile personal computers and mobile phones have been widely used. Many users carry these compact communication terminals which have a communication function and information processing function, and communicate through a network by connecting to the network at remote locations away from their homes.

In the Internet, an internet protocol (IP) is used as a communication protocol. The IP which is most commonly used now is IPv4, and a 32-bit address (IP address) is used as the address of the sender and the destination. In the Internet communication, a global IP address, in which a 32-bit IP address is uniquely allocated to each sender and destination, is adopted and individual senders and destinations are identified based on the IP addresses. However, the Internet has been expanding rapidly and the limited address space of IPv4, that is, the exhaustion of global addresses has become a problem. In order to solve the problem, the Internet Engineering Task Force (IETF) has proposed a new Internet Protocol version 6 (IPv6) as a next-generation IP address, in which the IP address space is expanded from 32 bits to 128 bits.

The IPv6 is a successor protocol of the current IPv4 and has the address format shown in FIG. 1. The IPv6 has a 128-bit configuration. The lower bits correspond to an interface ID (for example, IEEE 802 format) as a node identifier for uniquely identifying nodes on the Internet or a subnetwork, and the upper bits correspond to a network prefix as a location indicator for indicating the subnetwork to which the node is connected. Accordingly, the terminals connected to the same subnetwork have basically the same network prefix of the upper bits in the IPv6 address.

In the IPv6, since packets are transmitted based on only a prefix and a subnet number, the lower bits of the address, that is, the interface ID, can be allotted by a terminal manufacturer. Properly speaking, a part of the interface ID number is a manufacturer's identifier and the remainder is left to the discretion of the manufacturer. In the IPv6, the interface ID is a part of the IPv6 address and can be freely decided by the manufacturer, which is different from the Ipv4. By making the interface ID correspond to a user ID, a sold terminal and customer information regarding that sale, can be coupled via the interface ID.

However, the correspondence between an interface ID and a customer varies. The variations result from changes in the customer's behavior, such as when the customer replaces a terminal. The resultant variation in the correspondence between the interface ID and the customer badly affects any applications which associate a user with an IP address. For example, in IP communications, correspondence data for indicating general names of an addressee and the IP address of an apparatus used by an actual addressee is stored as an address resolution mechanism. The service is provided based on the correspondence data.

However, when the correspondence between the interface ID and the user varies due to the replacement of the user's terminal by the user, the new terminal cannot be used for communication until the correspondence data is updated. The reason for this is as follows: packets are transmitted based on a prefix and a subnet number, but an IPv6-compliant apparatus determines whether or not the apparatus receives the packets by verifying the entire IPv6 address, including the interface ID, at the end of the transmission.

As described above, it is difficult to apply the IPv6 to applications requiring high availability such as mobile phones, when the correspondence between an interface ID and a customer is varied or is changed. Therefore, it is desirable to provide improved systems and methods for applying the Ipv6 when correspondence between interface ID's and customers vary or change.

SUMMARY OF THE INVENTION

The present invention is directed to an address management system, an interface ID setting processor, a communication terminal, an address management method, and a computer program, in which the correspondence between an IPv6 address and a user can be kept, a service can be continuously provided even when a terminal is replaced by a user, and availability of a communication service can be increased. Additionally, the present invention enables the IPv6 to be used for an application in which particularly high availability is required, by a configuration for managing reception/transmission of the interface ID of IPv6 performed between terminals.

In one embodiment of the present invention, an address management system includes a communication terminal and an interface ID setting processor for issuing an interface ID as the address corresponding to the communication terminal. The communication terminal communicates with the interface ID setting processor. The interface ID setting processor outputs the interface ID to the communication terminal upon the authentication of the communication terminal. The communication terminal receives the interface ID and stores the interface ID in an interface ID storing memory in the communication terminal. The interface ID is set in the communication terminal in such a manner that the interface ID corresponds to the communication terminal. The interface ID configures the lower bits of an address configuration defined in IPv6.

The interface ID setting processor adds an electronic signature to the interface ID and outputs the interface ID with the electronic signature to the communication terminal upon the authentication of the communication terminal. The communication terminal receives the interface ID with the electronic signature. Upon the verification of the electronic signature, which determines whether the real interface ID has been falsified, outputs the real interface ID to a second communication terminal. The real interface ID is then set in the second communication terminal in such a manner that the interface ID corresponds to the second communication terminal.

The interface ID setting processor receives from the communication terminal apparatus a temporary interface ID which includes an electronic signature and which is not practically used, and, on the condition that the temporary interface ID is determined not to be falsified by verifying the electronic signature, outputs to the communication terminal apparatus a real interface ID which can be practically used so that the real interface ID is set in the communication terminal apparatus.

The interface ID setting processor receives the interface ID from a connected first communication terminal apparatus and outputs the interface ID to a second communication terminal apparatus so that the interface ID is set in the second communication terminal apparatus in such a manner that the interface ID corresponds to the second communication terminal apparatus.

The interface ID setting processor receives from a connected first communication terminal apparatus a real interface ID which includes an electronic signature. Upon the verification of the electronic signature, which determines whether the real interface ID has been falsified, the interface ID setting processor outputs the real interface ID to a second communication terminal. The real interface ID is then set in the second communication terminal such that the real interface ID corresponds to the second communication terminal.

The interface ID setting processor receives a real interface ID from the communication terminal, which includes an electronic signature. Upon the verification of the electronic signature of the real interface ID, the interface ID setting processor deletes data in an interface ID managing database to invalidate the real interface ID.

In a second embodiment of the present invention, an interface ID setting processor, which issues an interface ID as an address corresponding to a communication terminal, includes an authenticating unit for performing authentication with the communication terminal, a deciding unit for deciding whether the communication terminal is authenticated or not, and an output unit for outputting the interface ID to the communication terminal so that the interface ID is set in the communication terminal regarding the result of the decision by the deciding unit. The interface ID configures the lower bits of an address configuration defined in IPv6.

The interface ID setting processor adds an electronic signature to the interface ID and outputs the interface ID with the electronic signature to the communication terminal.

The interface ID setting processor receives a temporary interface ID from the communication terminal, which includes an electronic signature. Upon the verification of the electronic signature which determines whether the temporary interface ID has been falsified. The interface ID setting processor outputs a real interface ID to the communication terminal, which can be practically used, so that the real interface ID is set in the communication terminal.

The interface ID setting processor receives the interface ID from a first communication terminal, which is connected to the interface ID setting processor, and outputs the interface ID to a second communication terminal. The interface ID is then set in the second communication terminal in such a manner that the interface ID corresponds to the second communication terminal.

The interface ID setting processor receives from a connected first communication terminal a real interface ID including an electronic signature, which can be practically used, and which, upon the verification of the electronic signature, determines whether the real interface ID has been falsified. The interface ID setting processor then outputs the real interface ID to a second communication terminal and sets the real interface ID in the second communication terminal in such a manner that the real interface ID corresponds to the second communication terminal.

The interface ID setting processor receives from the communication terminal a real interface ID which includes an electronic signature and which can be practically used. Upon the verification of the electronic signature which determines whether the real interface ID has been falsified, the interface ID setting processor deletes data in an interface ID managing database to invalidate the real interface ID.

In a further embodiment of the present invention, a communication terminal includes a storing unit for storing an interface ID as an address corresponding to the communication terminal and an electronic signature. The interface ID configures the lower bits of an address configuration defined in IPv6.

The communication terminal receives the interface ID with the electronic signature from the interface ID setting processor, and upon the verification of the electronic signature, stores the received interface ID with the electronic signature in the interface ID storing memory in the communication terminal. The interface ID is then set in the communication terminal in such a manner that the interface ID corresponds to the communication terminal.

In another embodiment, an address management method for managing an address which is to be set in a communication terminal includes the steps of authenticating an interface ID issued by an interface ID setting processor as the address corresponding to the communication terminal outputting the interface ID from the interface ID setting processor to the communication terminal when the authentication is complete, and storing the interface ID received by the communication terminal in a memory in the communication terminal so that the interface ID is set in the communication terminal in such a manner that the interface ID corresponds to the communication terminal. The interface ID configures the lower bits of an address configuration defined in IPv6.

The interface ID setting processor adds an electronic signature to the interface ID and outputs the interface ID with the electronic signature to the communication terminal upon the authentication of the communication terminal. The communication terminal receives the interface ID with the electronic signature, and when the electronic signature is verified, stores the received interface ID with the electronic signature in the interface ID storing memory so that the interface ID is set in the communication terminal in such a manner that the interface ID corresponds to the communication terminal.

The interface ID setting processor receives a temporary interface ID, which includes an electronic signature and which is not practically used from the communication terminal when the electronic signature is verified. The interface ID setting processor outputs a real interface ID which can be used to the communication terminal so that the real interface ID is set in the communication terminal.

The interface ID setting processor receives the interface ID from a connected first communication terminal and outputs the interface ID to a second communication terminal so that the interface ID is set in the second communication terminal in such a manner that the interface ID corresponds to the second communication terminal.

The interface ID setting processor receives a real interface ID which includes an electronic signature from a connected first communication terminal and determines whether the electronic signature of the real interface ID is verified. The interface ID setting processor outputs the real interface ID to a second communication terminal so that the real interface ID is set in the second communication terminal in such a manner that the real interface ID corresponds to the second communication terminal when the determination is completed.

The interface ID setting processor receives a real interface ID which includes an electronic signature and which can be practically used from the communication terminal. When the electronic signature of the real interface ID has been verified, the interface setting processor deletes data in an interface ID managing database to invalidate the real interface ID.

According to a fifth embodiment of the present invention, a computer program in a computer system includes the steps of performing authentication between an interface ID setting processor issuing an interface ID as the address corresponding to the communication terminal and the communication terminal in which the address is to be set, and outputting the interface ID from the interface ID setting processor to the communication terminal when the authentication is complete.

According to a sixth embodiment of the present invention, a computer program issued in a computer system includes the steps of receiving a real interface ID which includes an electronic signature and which can be practically used from a connected first communication terminal and determining whether the electronic signature of the real interface ID has been verified, and outputting the real interface ID to a second communication terminal so that the real interface ID is set in the second communication terminal when the determination is complete.

The computer program of the present invention can be provided to a multipurpose computer system which can perform various program codes using a recording medium such as a compact disk (CD), floppy disk (FD), or MO, or using a communication medium such as a network. By providing a computer-readable program, the computer system can perform processing using the program.

Additional features and advantages of the present invention are described in, and will be apparent from, the following Detailed Description of the Invention and the Figures.

BRIEF DESCRIPTION OF THE DRAWINGS

FIG. 4 shows specific examples of processes in the address management system.
FIG. 10 shows the process of invalidating the interface ID in the address management system.

DETAILED DESCRIPTION OF THE INVENTION

Hereinafter, an address management system, an interface ID setting processor, a communication terminal, and an address management method of the present invention will be described in detail with reference to the drawings.

Figure 1:
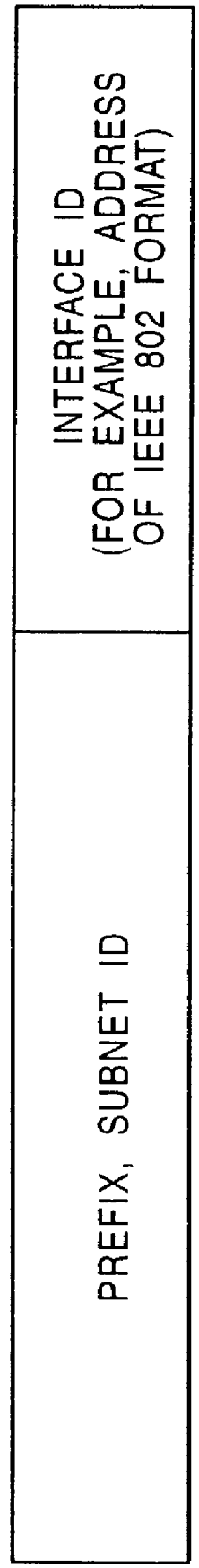
FIG. 1 shows the format of an IPv6 address.
Figure 2:
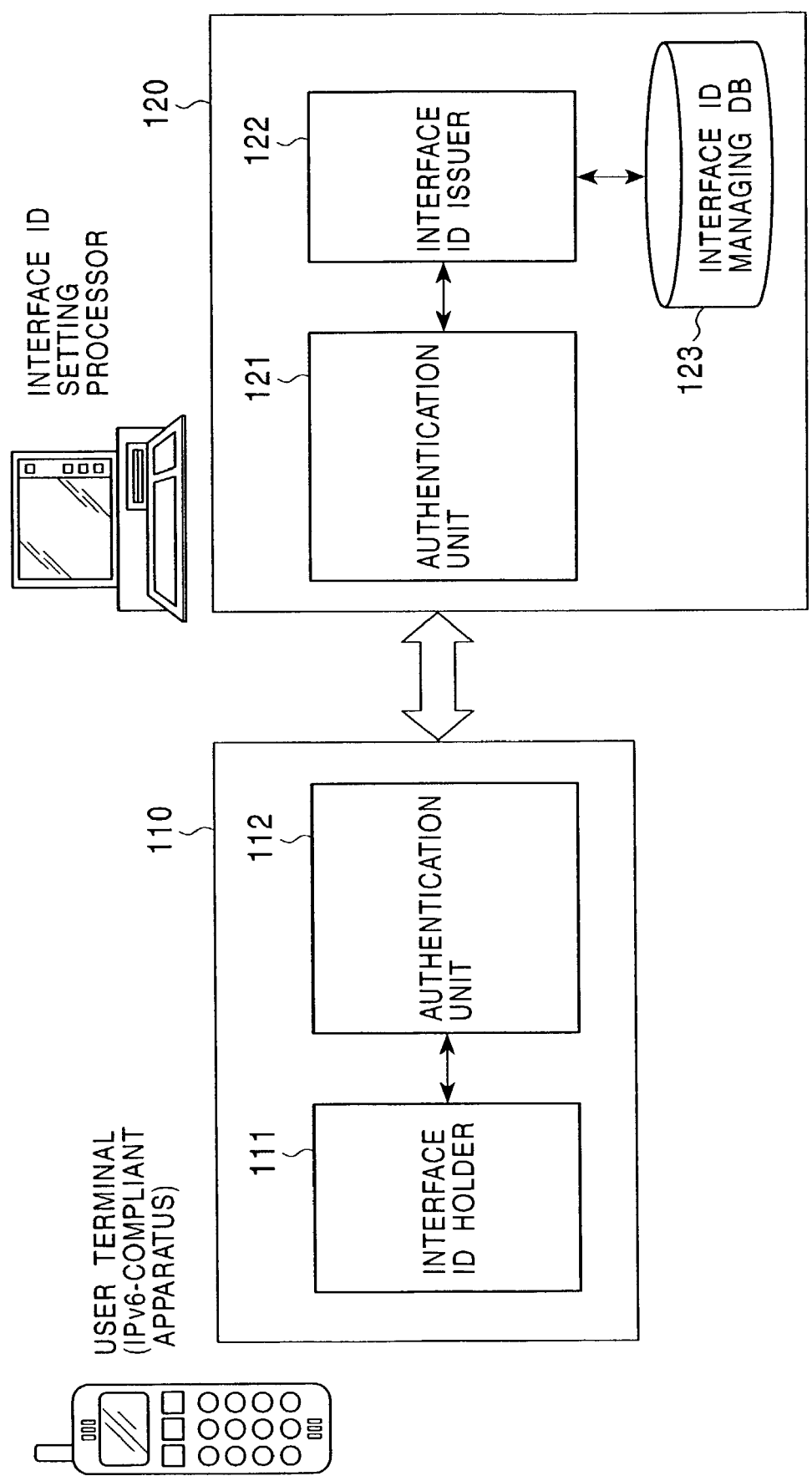
FIG. 2 illustrates an overview of an address management system of the present invention.

An overview of the address management system of the present invention will be described with reference to FIG. 2. In the address management system of the present invention, an address (IPv6 address) is set in a user terminal 110 as a communication terminal apparatus having a communication function, such as a mobile phone or a PDA. The user terminal 110 uses an application in which a user is associated with an IP address such as in IP telephony.

The user terminal 110 transfers data to an interface ID setting processor 120, which is described below. The user terminal 110 receives an interface ID, which is the lower-bit address of the IPv6 address, from the interface ID setting processor 120, and sets the interface ID as the address of the user terminal 110 in an interface ID holder 111 functioning as a memory such as a Read-Only Memory (ROM). The interface ID setting processor 120 communicates with the user terminal 110 and performs the following steps: the processor 120 transmits and sets the interface ID in the user terminal 110 (new issue process); receives the interface ID from the user terminal 110 and invalidates the interface ID (invalidation process); and hands over the interface ID, by receiving the interface ID from the user terminal 110 and transmitting and setting the received interface ID to a new user terminal (handover process).

The interface ID setting processor 120 has an internal or external interface ID managing database 123. An interface ID issuer 122 issues, invalidates, and hands over an interface ID for the connected user terminal, while referring to the interface ID managing database 123 so that a duplicate interface ID is not issued.

Prior to transferring the interface ID between the user terminal 110 and the interface ID setting processor 120, an authentication process is performed between the two apparatuses. The authentication process is performed between an authentication unit 112 of the user terminal 110 and an authentication unit 121 of the interface ID setting processor 120. The authentication process includes, for example, authentication of the manufacturer, the function of both apparatuses and the verification of the validity of the interface ID (checking for alterations and information about the issuer). Specific examples of the authentication process are described below. After the authentication process, when both of the apparatuses are determined to be valid, the above-described new issue process, invalidation process, and handover process of the interface ID are performed. During the interface ID handover process, the interface ID setting processor 120 performs the authentication process twice. First, the processor 120 authenticates the former user terminal, which is the sender of the interface ID, and then authenticates a new user terminal, which is the destination of the interface ID.

Figure 3:
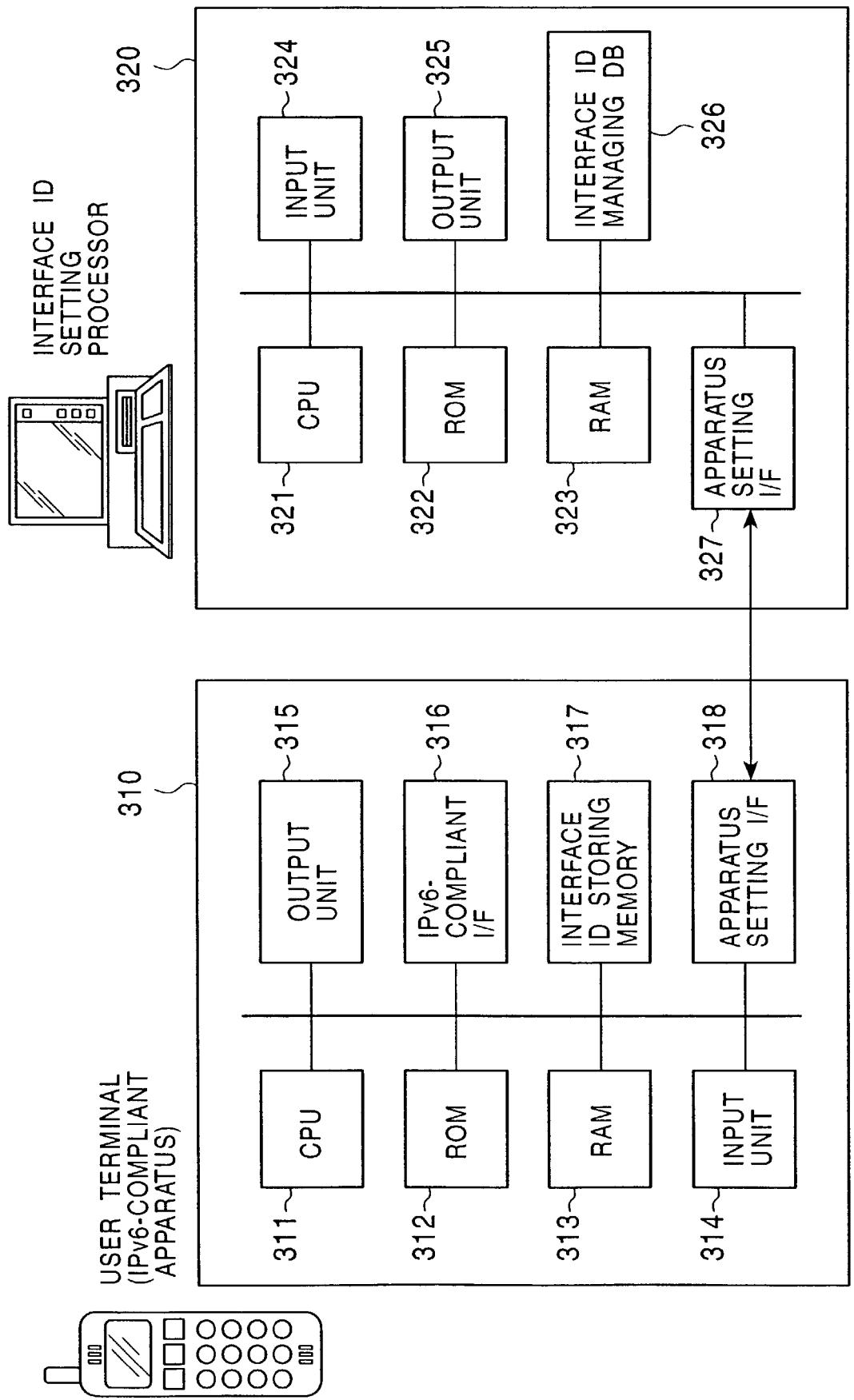
FIG. 3 shows the configuration of a user terminal and an interface ID setting processor in the address management system.

Next, an example of the hardware configuration of the user terminal and the interface ID setting processor will be described with reference to FIG. 3. First, the configuration of a user terminal 310 will be described. A central processing unit (CPU) 311 performs various operation programs and application programs. Specifically, the CPU 311 processes an upper-layer protocol of IPv6, processes an input/output operation of a user of the terminal, controls the reception/transmission of the interface ID performed between the interface ID setting processor and the user terminal, controls an authentication process, and so on. A read-only-memory (ROM) 312 stores either a program performed by the CPU 311 or fixed data as operation parameters. Specifically, a random access memory (RAM) 313 stores the program performed by the CPU 311 and the parameters which change during the program processing, and is also used as a work area.

An input unit 314 is operated by the user in order to input various commands to the CPU 311. An output unit 315 is, for example, a liquid crystal display (LCD), and displays various information as text or images.

An IPv6-compliant interface (I/F) 316 communicates with the router of the connected subnetwork, transmits data supplied from the CPU 311, RAM 313, and so on by packetizing the data, and receiving packets.

An IPv6-compliant interface ID storing memory 317 is a nonvolatile memory which stores the IPv6-compliant interface ID set in the user terminal and is not erased or cleared when the user terminal power is turned off. The reading and writing of data is controlled by the CPU 311. An apparatus setting interface (I/F) 318 is an interface used for the communication with the interface ID setting processor.

Now, the configuration of an interface ID setting processor 320 will be described. A central processing unit (CPU) 321 performs various operation programs and application programs. Specifically, the CPU 321 controls the reception and/or transmission of the interface ID between the interface ID setting processor and the user terminal, an authentication process, and so on. A read-only-memory (ROM) 322 stores either a program performed by the CPU 321 or fixed data as operation parameters. A random access memory (RAM) 323 is specifically used as a storing area for the program performed in the processes of the CPU 321 and parameters which change during the program processing, and is also used as a work area.

An input unit 324 is operated by the user to input various commands to the CPU 321. An output unit 325 such as a cathode-ray tube (CRT) or a liquid crystal display (LCD), displays various information as text or images.

An interface ID managing database 326 manages the issuing of interface Ids, stores data associating a user with an interface ID, stores data for managing expiration dates, and so on. In this embodiment, the interface ID managing database 326 is provided inside the interface ID setting processor 320. However, the interface ID managing database may be an external database connected to a network so that the database is shared by several interface ID setting processors.

An apparatus setting interface (I/F) 327 is an interface which is connected to the user terminal and sets a communication path used for performing a new issue process, invalidation process, and handover process of the interface ID.

Next, an outline of examples of specific processes in the address management system of the present invention will be described with reference to FIG. 4. As described above, the address (IPv6 address) is set in the user terminal, such as a mobile phone or a PDA. The user terminal is connected to the interface ID setting processor to perform a new issue process, invalidation process, and handover process of the interface ID.

As shown in FIG. 4, when the user terminal is manufactured, a temporary interface ID is stored in the interface ID storing memory and authentication data is written in the ROM, and then the user terminal is shipped. The temporary interface ID is an invalid interface ID which cannot be used for actual communication.

When the user terminal in which the temporary interface ID is written is sold, the seller deletes the temporary interface ID from the interface ID storing memory of the terminal. The user terminal then performs a setting process to write a real interface ID before providing the terminal to the user. It is the interface ID setting processor that performs this process. As described with reference to FIG. 2 or 3, the terminal in which the real interface ID is to be set is connected to the interface ID setting processor so that a new ID issuing process is performed once the authentication process is complete.

The seller performs a new ID issuing process when selling a new terminal, performs an ID invalidation process when a user terminal is returned from a user and performs an ID handover process when the user replaces an old terminal with a new one. Hereinafter, each of these processes will be described in detail.

New Interface ID Issuing Process

Figure 5:
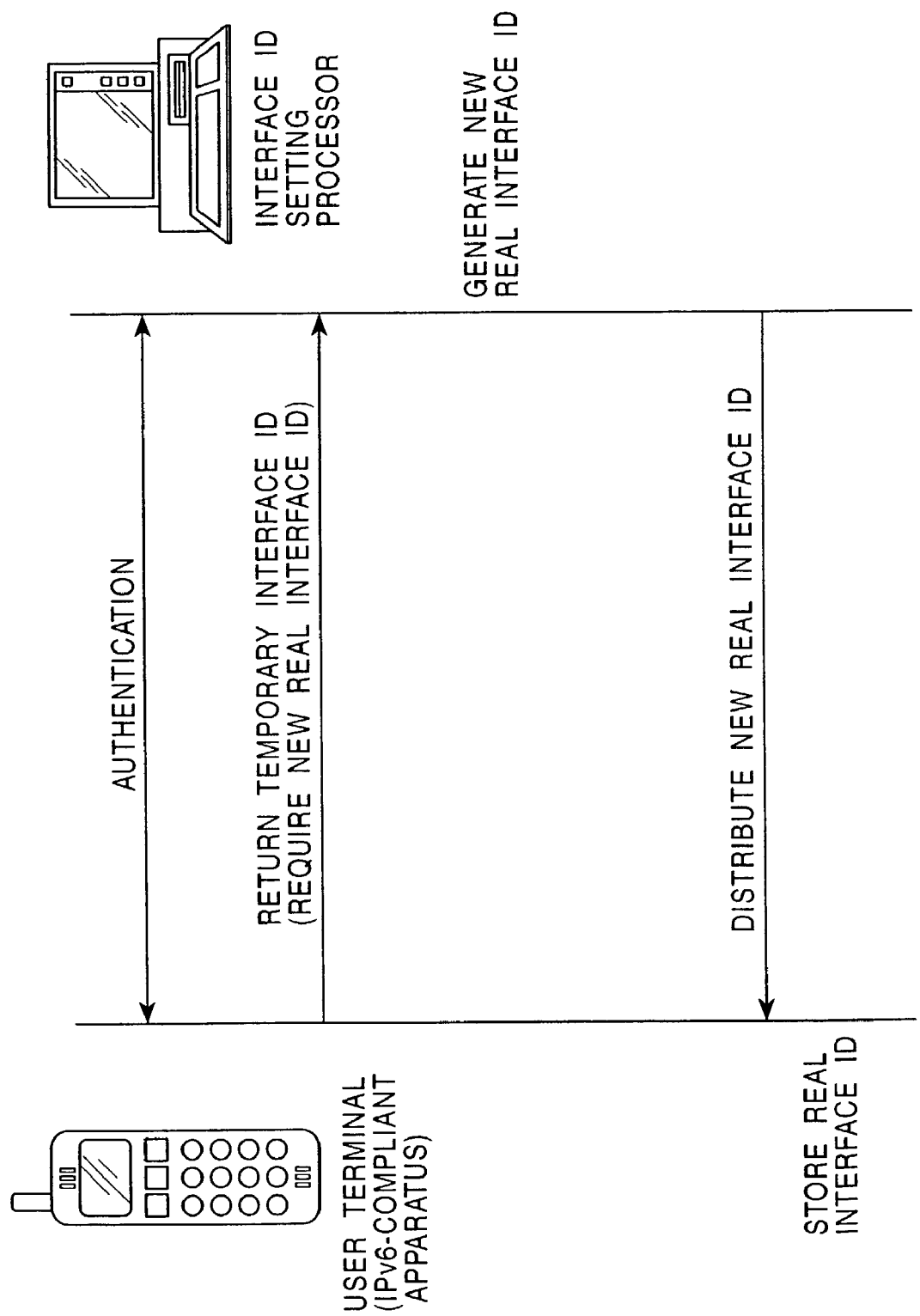
FIG. 5 shows the sequence of issuing a new interface ID in the address management system.

First, a new interface ID issuing process will be described in detail. FIG. 5 is for illustrating a sequence in the new interface ID issuing process. A temporary interface ID is written in the interface ID storing memory of the user terminal before the user terminal has been used after shipment from the factory.

First, the apparatus setting interfaces of the user terminal and the interface ID setting processor are connected. Any suitable physical method of connection may be used, but it is preferable to connect the two interfaces with a cable in order to prevent loss of communication data. It should be appreciated that other suitable methods may be used as long as communication can be performed. When a cable is used for the connection, the user terminal knows that it has been connected to the interface ID setting processor by using a mechanical switch in the cable installation mechanism provided in the user terminal. When connected, an authentication process is performed. The authentication process is performed to verify the validity of the apparatuses which perform communication. The following methods are adopted by the authentication process: a public-key authentication method, a common-key authentication method, a method in which Kerberos, which is tried-and-true in IPv4, and an electronic watermark are combined, and a method of designing and installing the interface specification proposed by the Secure Digital Music Initiative (SDMI).

As an example of the authentication process, the sequence of the public-key authentication method will be described with reference to FIG. 6. In order to perform a public-key encryption method, a public key Kpub-Pn, a private key Kpri-Pn, and a public key certificate CertPn of the user terminal (Pn) are stored in the ROM of the user terminal as authentication data. On the other hand, a public key Kpub-W, a private key Kpri-W, and a public key certificate CertW are stored in the interface ID setting processor (W).

Figure 6:
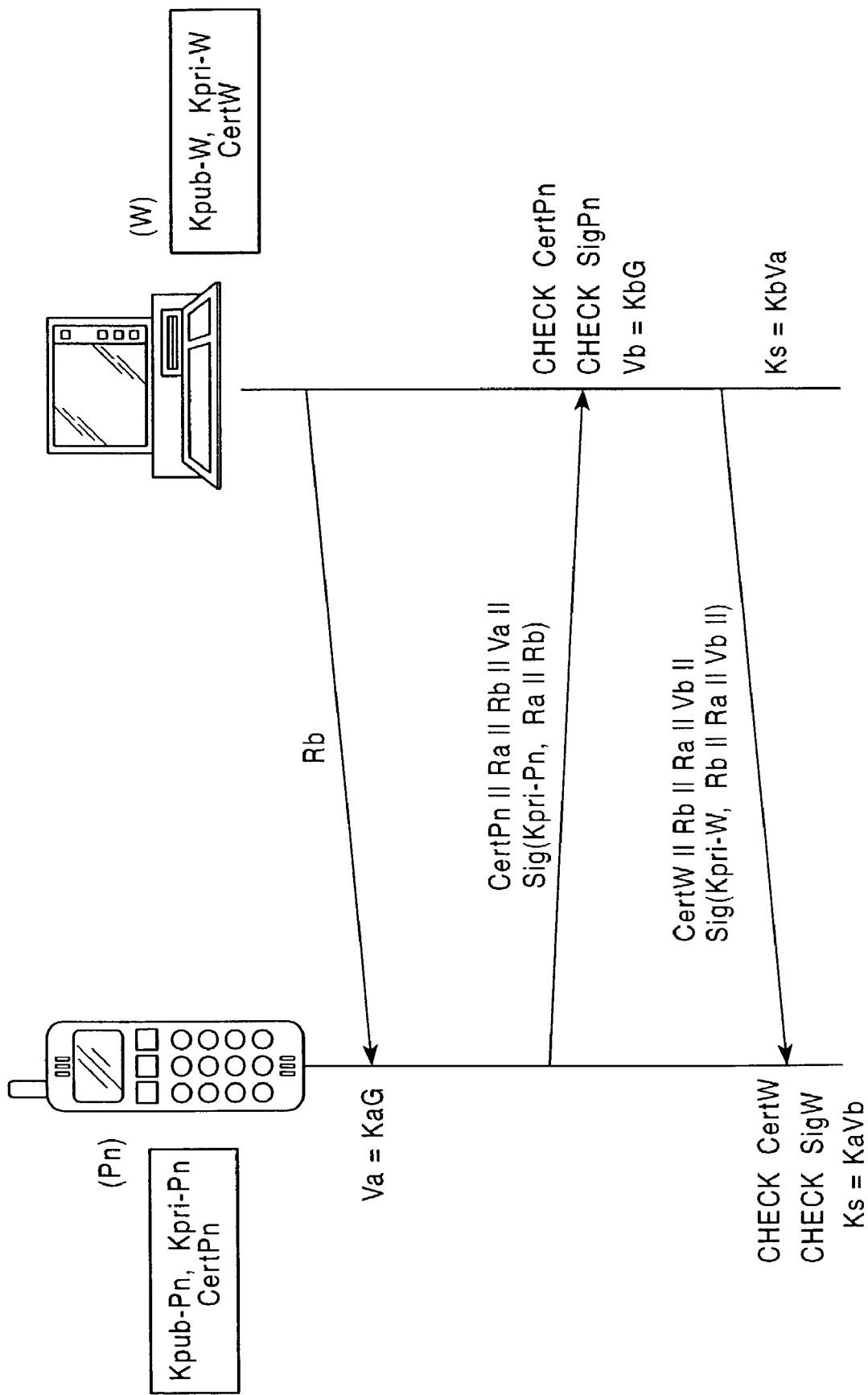
FIG. 6 shows the sequence of an authentication process in the address management system.

In FIG. 6, the interface ID setting processor generates a random number Rb and sends it to the user terminal. The user terminal generates random numbers Ra and Ka, multiplies Ka by G, which is a common point in the system (base point), on an elliptic curve E used in the public-key encryption method, in order to find Va. Furthermore, the user terminal transmits the data (CertPn∥Ra∥Rb∥Va) of the public key certificate (CertPn) to the interface ID setting processor, together with an electronic signature for the data Ra∥Rb∥Va, where the electronic signature is formed by using the private key Kpri-Pn. The electronic signature is formed by using a general digital signature technique, such as a message digest method, realized by combining an RSA code and a hash function SHA-1.

The interface ID setting processor verifies the validity of the public key certificate CertPn of the user terminal and the signature. When the validity is verified, the interface ID setting processor generates a random number Kb and transmits the data of a signature for the data Rb∥Ra∥Vb, the signature being formed by using the private key Kpri-W, to the user terminal, together with the data (CertW∥Rb∥Ra∥Vb) of the public key certificate.

After that, the user terminal verifies the validity of the public key certificate CertW of the interface ID setting processor and the signature. When the validity is verified, Ka is multiplied by Vb in the user terminal and Kb is multiplied by Va in the interface ID setting processor, on the elliptic curve E, and a session key Ks is obtained. With the above-described method, mutual authentication is performed between the interface ID setting processor and the user terminal. Thus, the session key Ks, which is an encryption key, is applied in the data communication and thereafter, can be shared.

Referring back to FIG. 5, the sequence of the new interface ID issuing process will be continued. When both the user terminal and the interface ID setting processor are verified as being valid in the mutual authentication process described with reference to FIG. 6, the user terminal reads the temporary interface ID written in the interface ID storing memory in the terminal and transmits it to the interface ID setting processor. This process is performed as a process for requiring a new real interface ID.

When the interface ID setting processor receives the temporary interface ID from the user terminal, it performs a process for generating a new real interface ID, and transmits the generated new real interface ID to the user terminal. Then, the user terminal receives the new real interface ID and stores it in the interface ID storing memory in the terminal so that the process is completed.

Figure 7:
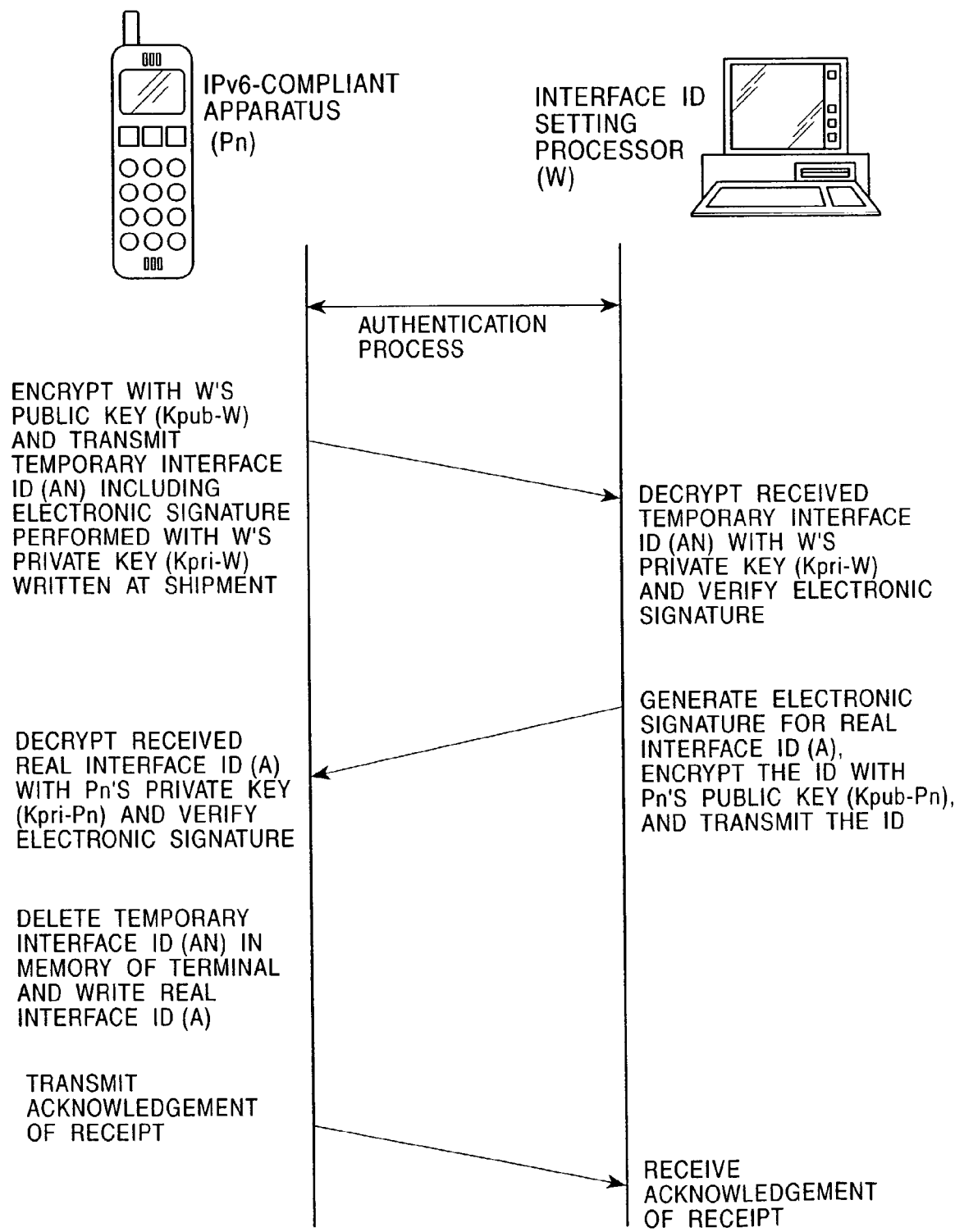
FIG. 7 shows a detailed return/issue process of the ID when a new interface ID is issued in the address management system.

Next, processes for returning the temporary interface ID and issuing the new real interface ID will be described in detail with reference to FIG. 7. After the mutual authentication between the interface ID setting processor and the user terminal has been completed, the user terminal transmits the temporary interface ID (AN), which is written into the interface ID storing memory at shipment, to the interface ID setting processor by encrypting the ID with the public key Kpub-W of the interface ID setting processor, where the public key Kpub-W is obtained in the foregoing authentication process. In this embodiment, the public key is used as a key for encryption in the data communication between the two apparatuses. However, the communication data can be encrypted by using the session key shared in the mutual authentication performed with the public-key encryption method.

Figure 8:
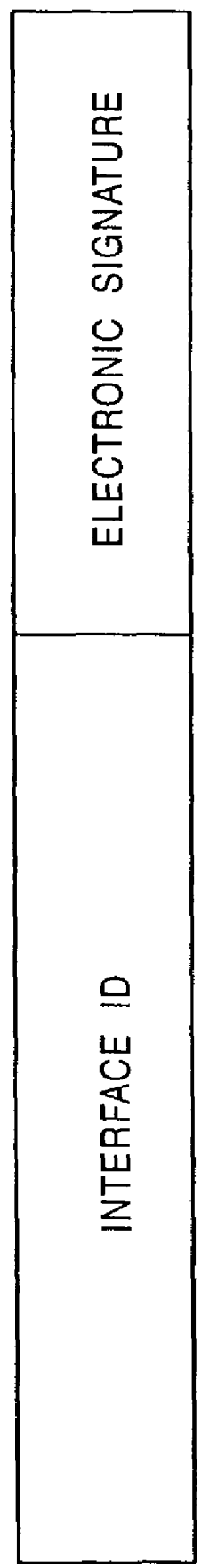
FIG. 8 shows the data configuration of the interface ID stored in the user terminal in the address management system.

Incidentally, the temporary interface ID written in the interface ID storing memory at shipment has an electronic signature generated by a predetermined ID issuing organization so as to prevent illegal falsification. For example, the temporary interface ID is signed with the private key Kpri-W of the interface ID setting processor. FIG. 8 shows the data configuration of the temporary interface ID written in the interface ID storing memory at shipment.

As shown in FIG. 8, interface ID data and an electronic signature generated for the interface ID are stored together. The electronic signature is formed by using a general digital signature technique, such as a message digest method realized by combining an RSA code and a hash function SHA-1. The temporary interface ID is transmitted to the interface ID setting processor together with the signature when it is rewritten to a real interface ID. Then, after the interface ID setting processor verifies the signature and it is determined that no falsification has been performed, a process for issuing a real interface ID is performed.

Description will be continued referring back to FIG. 7. The interface ID setting processor, which has received the encrypted temporary interface ID from the user terminal, decrypts the ID with its own private key Kpri-W, verifies the electronic signature on the temporary interface ID, and determines whether or not falsification has been performed. Herein, the electronic signature is formed with the private key of the interface ID setting processor. However, the electronic signature may be formed with a private key of another ID issuing organization. In that case, the public key of the ID issuing organization for signature verification is stored in the interface ID setting processor, which performs signature verification.

After the signature verification, when the received temporary interface ID is determined to be valid data, the interface ID setting processor issues a new real interface ID which can actually be used to the user terminal. When the new real interface ID is issued, management is performed so that a duplicate ID of the issued ID, which is registered in the interface ID managing database, is not issued. Also, the newly issued ID is registered in the interface ID managing database. The interface ID managing database is a database for managing the issuing of interface IDs and stores data associating users with the interface IDs, data for managing expiration dates, and so on.

The interface ID setting processor forms an electronic signature by using the private key Kpri-W for the newly issued interface ID, encrypts the ID with the public key Kpub-Pn of the user terminal, and transmits the ID to the user terminal.

The user terminal receives the encrypted real interface ID from the interface ID setting processor, decrypts the ID with its own private key Kpri-Pn. Then, the user terminal verifies the electronic signature on the real interface ID, determines whether or not falsification has been performed, deletes the temporary interface ID in the interface ID storing memory of the terminal, and stores the real interface ID including the electronic signature. After these processes, the user terminal transmits an acknowledgement of receipt to the interface ID setting processor. The interface ID setting processor receives the acknowledgement of receipt and the process is completed.

Interface ID Handover Process

Figure 9:
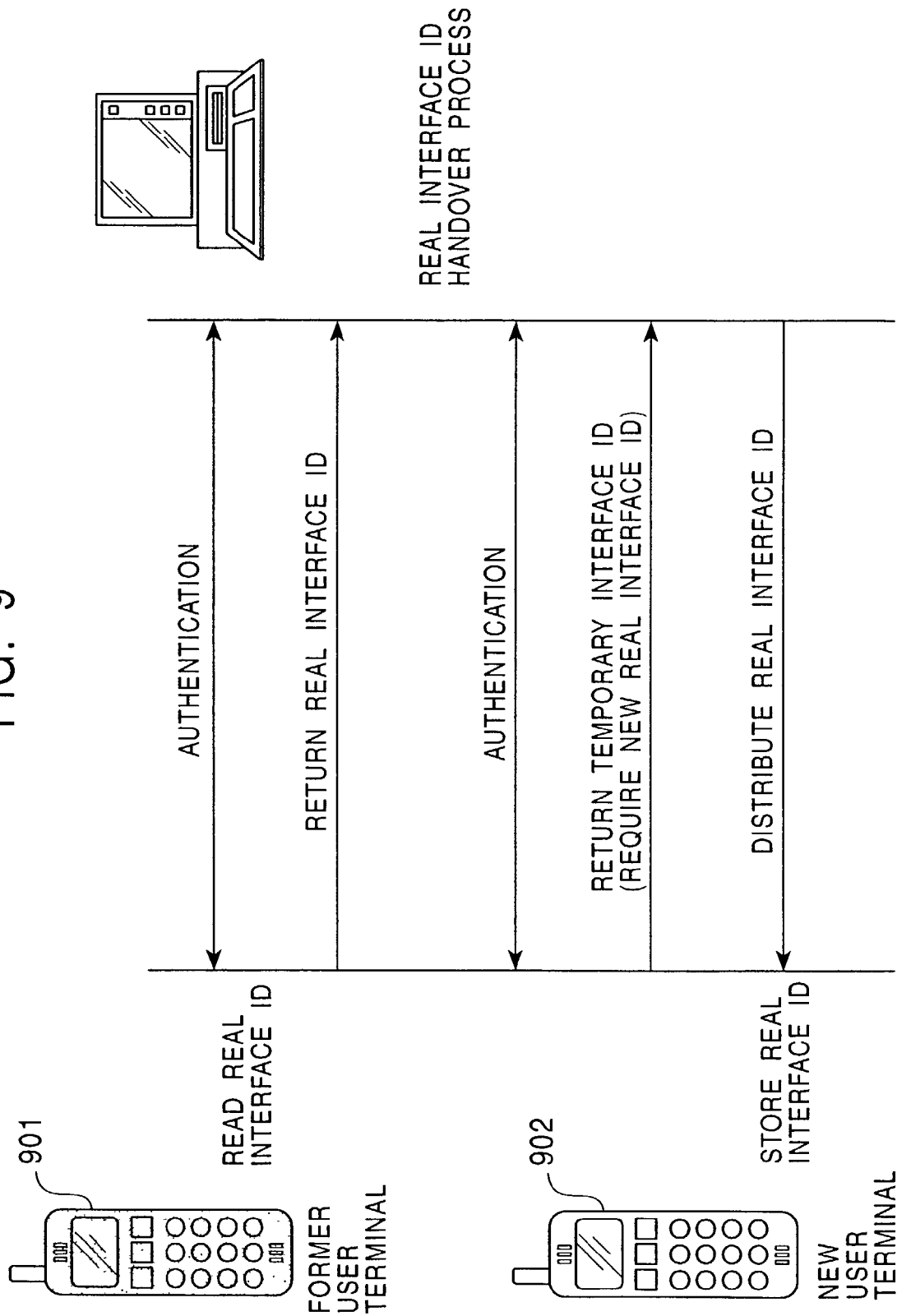
FIG. 9 shows process of handing over the interface ID in the address management system.

Next, the interface ID handover process will be described in detail. FIG. 9 is for illustrating the sequence of the interface ID handover process. Herein, a former user terminal 901, which stops using the real interface ID and outputs the ID, and a new user terminal 902, which stores and starts using the real interface ID, are connected to the interface ID setting processor in order for the process to be performed.

The real interface ID with an electronic signature is written in the interface ID storing memory of the former user terminal 901. The new user terminal 902 has not been used since shipment from the factory and a temporary interface ID with an electronic signature is written in the interface ID storing memory.

First, the apparatus setting interface of the former user terminal 901, which stops using the real interface ID and outputs the ID, and the apparatus setting interface of the interface ID setting processor are connected so as to perform a mutual authentication process. As the authentication process, as described above, the following methods can be adopted: a public-key authentication method, a common-key authentication method, a method in which Kerberos, which is tried-and-true in IPv4, and an electronic watermark are combined; and a method of designing and installing the interface specification proposed by the Secure Digital Music Initiative (SDMI).

When the apparatuses are determined to be valid in the mutual authentication process, the former user terminal 901 reads the real interface ID written in the interface ID storing memory of the terminal and transmits the ID to the interface ID setting processor. The interface ID setting processor receives the real interface ID from the former user terminal 901. Then, the apparatus setting interface of the new user terminal 902, which stores and starts using the real interface ID, and the apparatus setting interface of the interface ID setting processor are connected so as to perform the mutual authentication process.

If the mutual authentication process is successfully done, the new user terminal 902 returns the temporary interface ID, which was written in the interface ID storing memory at shipment, to the interface ID setting processor. Then, the interface ID setting processor transmits the real interface ID received from the former user terminal 901 to the new user terminal 902. After that, the new user terminal 902 stores the received real interface ID in the interface ID storing memory. Also, the interface ID setting processor updates data registered in the interface ID managing database, in accordance with the ID handover process. The interface ID managing database is a database for managing the issuing of interface Ids, updates data associating users with the interface IDs, updates data for managing expiration dates, and so on.

The process performed between the new user terminal 902 and the interface ID setting processor in FIG. 9 is the same as that described with reference to FIGS. 5 to 7, and therefore the process is not described in detail. As described above, data encryption, signature generation, and authentication are performed. The former user terminal 901 is returned to a store having an interface ID setting processor and is discarded after the interface ID stored in the interface ID storing memory is deleted.

Interface ID Invalidation Process

Next, the interface ID invalidation process will be described in detail. FIG. 10 is for illustrating the sequence in the interface ID invalidation process. Herein, the user terminal stops using the real interface ID and outputs the ID.

The real interface ID with an electronic signature is written in the interface ID storing memory of the user terminal. The apparatus setting interface of the user terminal, which stops using the real interface ID and which performs invalidation of the ID, is connected to the apparatus setting interface of the interface ID setting processor so as to perform a mutual authentication process.

When both apparatuses are determined to be valid in the mutual authentication process, the user terminal reads the real interface ID written in the interface ID storing memory in the terminal and transmits the ID to the interface ID setting processor. The interface ID setting processor receives the real interface ID from the user terminal, and then deletes the data registered in the interface ID managing database to perform the real interface ID invalidation process, upon the verification of the electronic signature. The interface ID managing database is a database for managing the issuing of interface IDs, deletes data associating users with the interface IDs, data for managing expiration dates, and so on.

Then, the interface ID setting processor transmits a notice of interface ID invalidation process completion to the user terminal. The user terminal receives the completion notice and deletes the real interface ID written in the interface ID storing memory in the terminal.

Incidentally, in the foregoing interface ID handover process, after the former user terminal 901 returns the real interface ID, a notice of process completion may be transmitted to the former user terminal, as in the above-described interface ID invalidation process. The former user terminal then may delete the real interface ID written in the interface ID storing memory in the terminal based on the notice, and the process may proceed to a process of storing the real interface ID in the new user terminal. With this arrangement, during the interface ID handover process, it can be ensured that the former and new user terminals do not operate simultaneously.

Multiple interface IDs can be written in the user terminal as required. For example, when a new interface ID is added to the user terminal in order to use a different service, such as an anycast service, in one IPv6-compliant apparatus, or when two or more IPv6-compliant apparatuses are replaced by one IPv6-compliant apparatus, multiple interface IDs stored in the former IPv6-compliant apparatuses may be handed over to one new IPv6-compliant apparatus. In this case, a handover process, a new issuing process, and an invalidation process are performed for the interface ID in the above-described manner. By storing the multiple interface IDs in the user terminal, services having various qualities and functions may be associated with each of the interface IDs. For example, by storing an anycast address X used in a videophone application service as the interface ID in the user terminal, the user terminal can enjoy a videophone service by using the anycast address X.

The series of processes described above may be performed by a composite configuration of hardware and software. The software process may be performed by installing a program which stores a process sequence in the memory of a computer incorporated in dedicated hardware, or by installing the program in a multipurpose computer which can perform various processes.

For example, the program may be pre-recorded in a recording medium such as a hard disc or a ROM. Alternatively, the program may be temporarily or permanently stored (recorded) in a removable recording medium, such as a floppy disc, a compact disc read only memory (CD-ROM), a magneto optical (MO) disc, a digital versatile disc (DVD), a magnetic disc, or a semiconductor memory. These removable recording media may be provided as so-called packaged software.

The program may be installed in a computer from the above-described removable recording media. Also, the program may be wirelessly transferred from a download site to a computer, or may be transferred through a wired network such as a local area network (LAN), or the Internet, to a computer. The computer receives the transferred program and installs the program in a recording medium such as a hard disc in the computer. The various processes described above may be performed in a time series according to the description. Alternatively, the processes may be performed in parallel or individually according to the ability of the apparatus performing the processes, as required.

As described above, according to the address management system, the interface ID setting processor, the communication terminal apparatus, the address management method, and the computer program of the present invention, an interface ID can be handed over from one communication terminal to another. Also, the interface ID may be a user's unique identifier without losing the correspondence between the interface ID and the user. Accordingly, a useful infrastructure for individualized services is achieved. The interface ID may be constant for one user, even when an apparatus is replaced, and thus IPv6 communication can be used as a user-associated address in a high availability service, such as telephone services.

Also, according to the address management system and the address management method of the present invention, the interface ID may be returned and reused. Accordingly, the interface ID may be efficiently used. In addition, since the task of inputting the interface ID to the terminal can be omitted, the interface ID can be distributed accurately and user conveniences improved.

Furthermore, according to the address management system and the address management method of the present invention, since multiple interface IDs can be stored in the user terminal, services having various qualities and functions can be associated with each interface ID. Accordingly, a user terminal having advanced functionality can use several services and thus products may be differentiated. For example, when the attribute of a videophone is assigned to the anycast address X, the user terminal can enjoy a videophone service by adding the anycast address X to the user terminal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An address management system, comprising:
   a communication terminal; and
   an interface ID setting processor for issuing an interface ID as an address corresponding to the communication terminal upon receiving a temporary interface ID from a user terminal, wherein the communication terminal communicates with the interface ID setting processor, and wherein the interface ID setting processor outputs the interface ID to the communication terminal upon authentication of the communication terminal, and
   the communication terminal apparatus receives the interface ID and stores the interface ID in an interface ID storing memory in the communication terminal so that the interface ID is set in the communication terminal such that the interface ID corresponds to the communication terminal,
   wherein the temporary interface ID is transmitted for requesting the interface ID and is invalid with regard to effecting data communications with other communication terminals.

2. The address management system according to claim 1, wherein the interface ID configures lower bits of an address configuration defined in IPv6.

3. The address management system according to claim 1, wherein the interface ID setting processor adds an electronic signature to the interface ID and outputs the interface ID with the electronic signature to the communication terminal apparatus upon the authentication of the communication terminal, and
   wherein the communication terminal receives the interface ID with the electronic signature, and when the electronic signature is verified, stores the received interface ID with the electronic signature in the interface ID storing memory so that the interface ID is set in the communication terminal such that the interface ID corresponds to the communication terminal.

4. The address management system according to claim 1, wherein the interface ID setting processor receives a temporary interface ID which includes an electronic signature and which is not practically used, and, upon verification of the electronic signature, outputs a real interface ID which can be practically used to the communication terminal so that the real interface ID is set in the communication terminal.

5. The address management system according to claim 1, wherein the interface ID setting processor receives the interface ID from a connected first communication terminal, which is connected to the interface ID setting processor, and outputs the interface ID to a second communication terminal so that the interface ID is set in the second communication terminal such that the interface ID corresponds to the second communication terminal.

6. The address management system according to claim 1, wherein the interface ID setting processor receives a real interface ID which includes an electronic signature and which can be practically used from a first communication terminal and, upon verification of the electronic signature, outputs the real interface ID to a second communication terminal so that the real interface ID is set in the second communication terminal such that the real interface ID corresponds to the second communication terminal.

7. The address management system according to claim 1, wherein the interface ID setting processor receives a real interface ID which includes an electronic signature and which can be practically used from the communication terminal, and, upon verification of the electronic signature, deletes data in an interface ID managing database to invalidate the real interface ID.

8. An interface ID setting processor for issuing an interface ID as an address corresponding to a communication terminal upon receiving a temporary interface ID from a user terminal, the processor comprising:
   authenticating parts for performing authentication with the communication terminal;
   deciding parts for deciding whether the communication terminal is authenticated or not; and
   an output for outputting the interface ID to the communication terminal so that the interface ID is set in the communication terminal according to the result of the decision by the deciding parts,
   wherein the temporary interface ID is transmitted for requesting the interface ID and is invalid with regard to effecting data communications with other communication terminals.

9. The interface ID setting processor according to claim 8, wherein the interface ID configures lower bits of an address configuration defined in IPv6.

10. The interface ID setting processor according to claim 8, wherein an electronic signature is generated by the interface ID setting processor which is associated with the interface ID, and wherein the processor outputs the interface ID with the electronic signature to the communication terminal.

11. The interface ID setting processor according to claim 8, wherein the interface ID setting processor receives a temporary interface ID which includes an electronic signature and which is not practically used from the communication terminal, and, upon verification of the electronic signature, outputs a real interface ID, which can be practically used, to the communication terminal so that the real interface ID is set in the communication terminal apparatus.

12. The interface ID setting processor according to claim 8, wherein the interface ID setting processor receives the interface ID from a first communication terminal apparatus, which is connected to the interface ID setting processor, and outputs the interface ID to a second communication terminal so that the interface ID is set in the second communication terminal such that the interface ID corresponds to the second communication terminal.

13. The interface ID setting processor according to claim 8, wherein the interface ID setting processor receives a real interface ID which includes an electronic signature and which can be practically used, and, upon the verification of the electronic signature, outputs the real interface ID to a second communication terminal so that the real interface ID is set in the second communication terminal such that the real interface ID corresponds to the second communication terminal.

14. The interface ID setting processor according to claim 8, wherein the interface ID setting processor receives a real interface ID which includes an electronic signature and which can be practically used from the communication terminal and, upon verification of the electronic signature, deletes data in an interface ID managing database to invalidate the real interface ID.

15. A communication terminal for performing communication upon receiving a temporary interface ID from a user terminal, comprising storing parts for storing an interface ID as an address corresponding to the communication terminal and an electronic signature for verifying falsification,
wherein the temporary interface ID is transmitted for requesting the interface ID and is invalid with regard to effecting data communications with other communication terminals.

16. The communication terminal apparatus according to claim 15, wherein the interface ID configures lower bits of an address configuration defined in IPv6.

17. The communication terminal apparatus according to claim 15, wherein the communication terminal apparatus receives the interface ID with the electronic signature from and interface ID setting processor, and, upon verification of the electronic signature, stores the received interface ID with the electronic signature in an interface ID storing memory in the communication terminal so that the interface ID is set in the communication terminal such that the interface ID corresponds to the communication terminal.

18. An address management method for managing an address which is to be set in a communication terminal upon receiving a temporary interface ID from a user terminal for performing communication, comprising:
performing authentication between an interface ID setting processor issuing an interface ID as the address corresponding to the communication terminal and the communication terminal in which the address is to be set;
outputting the interface ID from the interface ID setting processor to the communication terminal when the authentication is complete; and
storing the interface ID received by the communication terminal in a memory in the communication terminal so that the interface ID is set in the communication terminal such that the interface ID corresponds to the communication terminal,
wherein the temporary interface ID is transmitted for requesting the interface ID and is invalid with regard to effecting data communications with other communication terminals.

19. The address management method according to claim 18, further comprising the step of configuring lower bits of an address configuration defined in IPv6.

20. The address management method according to claim 18, further comprising the steps of:
adding an electronic signature to the interface ID;
outputting the interface ID with the electronic signature to the communication terminal upon the authentication of the communication terminal;
receiving the interface ID with the electronic signature; and
storing the received interface ID with the electronic signature in an interface ID storing memory so that the interface ID is set in the communication terminal such that the interface ID corresponds to the communication terminal when the electronic signature is verified.

21. The address management method according to claim 18, further comprising the steps of
receiving a temporary interface ID which includes an electronic signature and which is not practically used from the communication terminal, outputting a real interface ID which can be practically used to the communication terminal so that the real interface ID is set in the communication terminal when the electronic signature of the temporary interface is verified.

22. The address management method according to claim 18, further comprising the steps of:
receiving the interface ID from a connected first communication terminal; and
outputting the interface ID to a second communication terminal so that the interface ID is set in the second communication terminal such that the interface ID corresponds to the second communication terminal.

23. The address management method according to claim 18, further comprising the steps of:
receiving a real interface ID which includes an electronic signature and which can be practically used from a connected first communication terminal;
verifying an electronic signature of the real interface ID; and
outputting the real interface ID to a second communication terminal so that the real interface ID is set in the second communication terminal such that the real interface ID corresponds to the second communication terminal when the determination is complete.

24. The address management method according to claim 18, further comprising the steps of:
receiving a real interface ID which includes an electronic signature and which can be practically used from the communication terminal;
verifying an electronic signature of the real interface ID; and
deleting data in an interface ID managing database to invalidate the real interface ID.

25. A computer program in which an address to be set in a communication terminal upon receiving a temporary interface ID from a user terminal for performing communication is issued in a computer system, the program comprising the steps of:
performing authentication between an interface ID setting processor issuing an interface ID as the address corresponding to the communication terminal and the communication terminal in which the address is to be set; and
outputting the interface ID from the interface ID setting processor to the communication terminal when the authentication is complete, wherein the temporary interface ID is transmitted for requesting the interface ID and is invalid with regard to effecting data communications with other communication terminals.

26. A computer program in which an address to be set in a communication terminal upon receiving a temporary interface ID from a user terminal for performing communication is issued in a computer system, the program comprising the steps of:

receiving a real interface ID which includes an electronic signature and which can be practically used from a connected first communication terminal apparatus;

verifying the electronic signature of the real interface ID; and outputting the real interface ID to a second communication terminal so that the real interface ID is set in the second communication terminal when the verification is complete, wherein the temporary interface ID is transmitted for requesting the real interface ID and is invalid with regard to effecting data communications with other communication terminals.

* * * * *